Dec. 5, 1961 T. L. DAY ET AL 3,011,518
PNEUMATIC DAMPER
Filed July 9, 1958 4 Sheets-Sheet 1
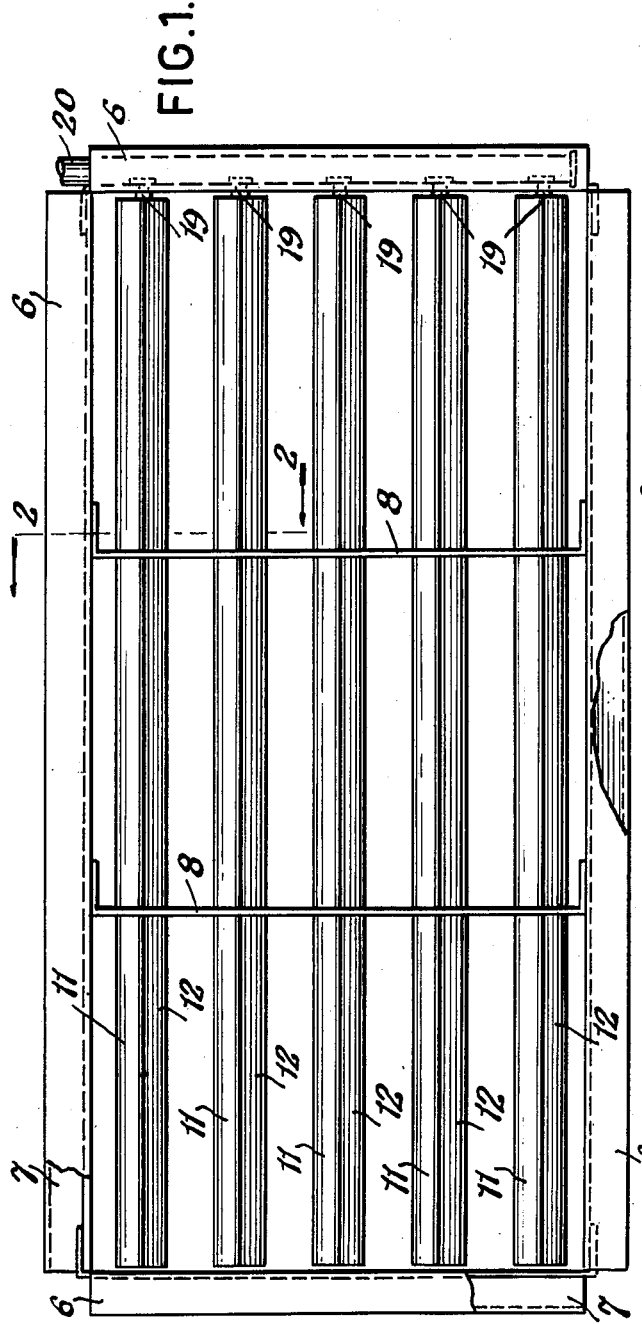
INVENTORS
Thomas L. Day &
Edgar J. Totsas
BY
Attorney Dec. 5, 1961  T. L. DAY ET AL  3,011,518
PNEUMATIC DAMPER Filed July 9, 1958  4 Sheets-Sheet 2

INVENTOR.
Thomas L. Day &
BY Edgar J. Totsas

Attorney

Dec. 5, 1961

T. L. DAY ET AL 3,011,518

PNEUMATIC DAMPER

Filed July 9, 1958

INVENTOR.
Thomas L. Day &
BY Edgar J. Totsas

Attorney

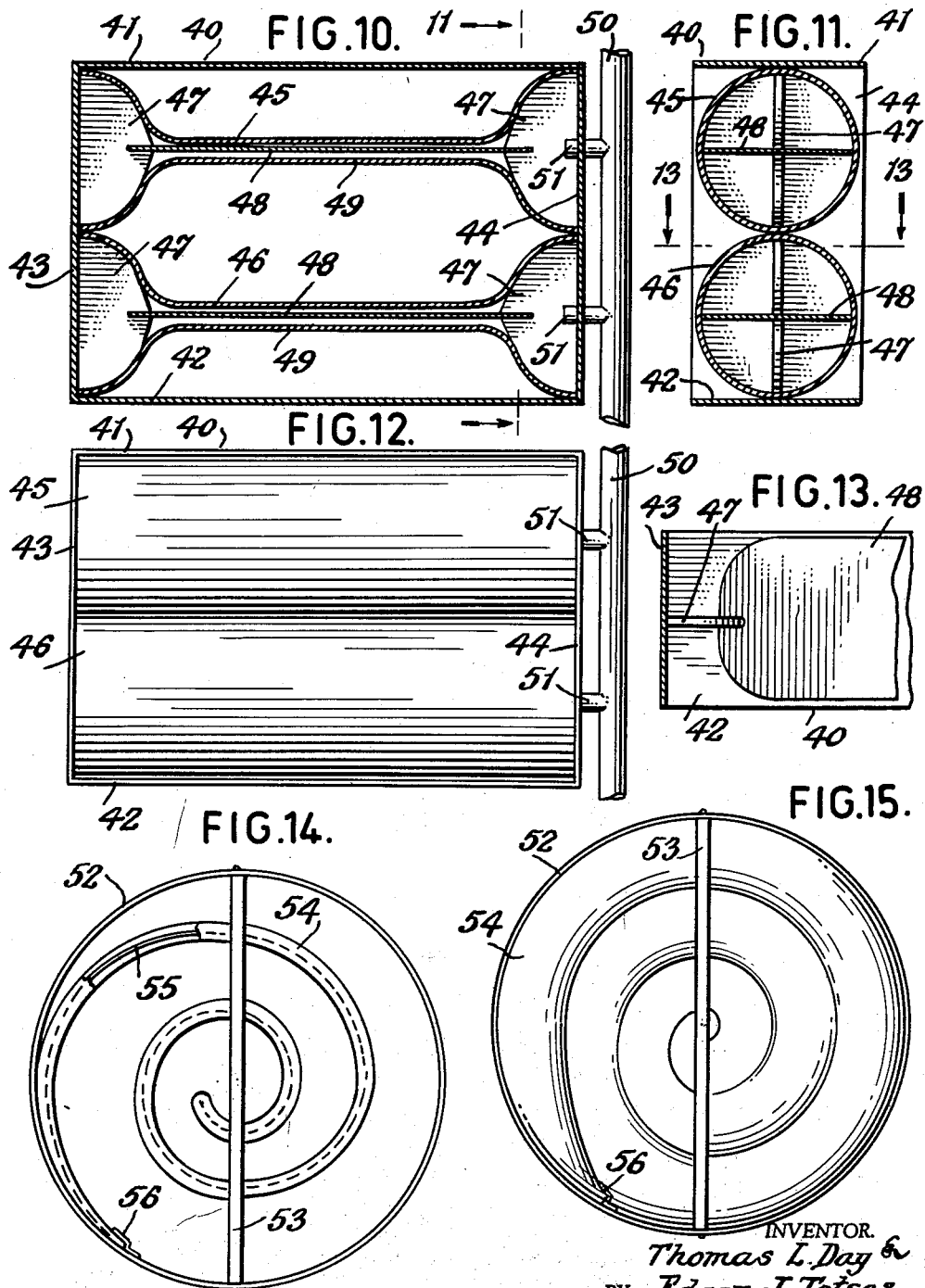

United States Patent Office 3,011,518
Patented Dec. 5, 1961

3,011,518
PNEUMATIC DAMPER
Thomas L. Day, Bethel, and Edgar J. Totsas, Danbury, Conn., assignors to Connor Engineering Corporation, Danbury, Conn., a corporation of New York
Filed July 9, 1958, Ser. No. 747,503
4 Claims. (Cl. 137—601)

This invention relates to pneumatic dampers or valves, sometimes referred to as attenuators, and particularly to a type adapted for use in connection with air-conditioning systems.

At the present time, high velocity duct work and high pressure dampers or valves are widely used. The type of dampers or valves employed in this type of installation are often in the form of tapered plugs which are moved axially, or an arrangement by which vanes are rotated or hinged by a separate motor or operator. With arrangements of such construction, difficulty is often encountered, particularly in the larger sizes since as the size increases the friction of the valve movement and the linkage connecting it to the operator offers a problem. Tight closeoff is often found to be difficult in the larger sized valves or dampers.

It is an object of the present invention to provide a damper or valve construction in which closure or shut-off is effected by pneumatic means, so that no additional operator or linkage connected thereto is required to motivate the damper, and hence moving parts are reduced to a minimum.

It is an object of the invention to provide a device of this kind in which friction is reduced to a negligible amount so that a definite degree of movement of the damper is obtained with a very slight change of pneumatic pressure, with the result that lag or hysteresis is practically eliminated.

With these and other objects to be hereinafter set forth in view, we have devised the arrangement of parts to be described and more particularly pointed out in the claims appended hereto.

In the accompanying drawings, wherein several illustrative embodiments of the invention are shown, FIG. 1 is a front elevational view of a damper or valve construction according to the invention, and with certain parts broken away to disclose construction;

FIG. 2 is a sectional view, taken substantially on the line 2—2 of FIG. 1, looking in the direction of the arrows;

FIG. 10 is a vertical sectional view through another embodiment of the invention;

FIG. 11 is a sectional view, taken substantially on the line 11—11 of FIG. 10, looking in the direction of the arrows;

FIG. 12 is a front elevational view of the damper of FIG. 10, showing the same in its inflated condition;

FIG. 13 is a sectional view taken substantially on the line 13—13 of FIG. 11, looking in the direction of the arrows;

FIG. 14 is a front elevational view of a spiral type of pneumatic damper, and

FIG. 15 shows the damper of FIG. 14 in its inflated or closed condition.

Figure 5:
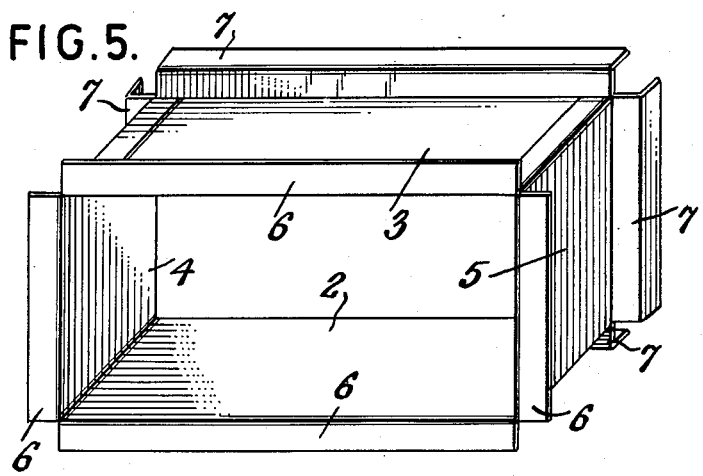
FIG. 5 is a perspective view of the casing for the damper.
Figure 6:
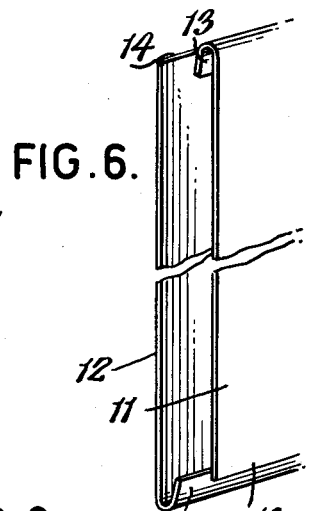
FIG. 6 is a perspective view of portions of the vanes.

Referring to the drawings, and more particularly to FIGS. 1 to 6 inclusive, there is therein generally indicated at 1, a housing or casing in which the damper or valve is contained, the details of construction of the casing being more clearly shown in FIG. 5. It will be therein noted that the casing is generally of rectangular form and thus includes a bottom wall 2, a top wall 3 and end walls 4 and 5. At its forward end, each of the walls 2, 3, 4 and 5 is provided with a laterally-extending flange 6, while angular flanges 7 are provided at the opposite ends of these walls, the several flanges providing attaching means by which one end of the casing is secured to an air duct and its opposite end to a suitable outlet device in a wall or ceiling, such device being not shown herein since it forms no part of the present invention.

Extending between the upper wall 3 and lower wall 2 are struts or brace members 8 (FIGS. 1 and 2) and each of these members is formed with a plurality of spaced notches 9 into which the longitudinal edges of vanes are fitted. These vanes consists of lengthy metallic plates, preferably of aluminum or other non-corrosive metal, and they are capable of flexing or bending movement under the pressure of air delivered into flexible casings 10 contained within the vanes. Each vane is composed of two plates interengaged along their longitudinal edges in the manner clearly shown in FIG. 2. That is to say, the plate 11 is provided at one of its longitudinal edges with a turned-over flange 13 under which the straight edge 14 of its companion plate is extended. The plate 12 has its longitudinal edge formed with a turned-over flange 15 under which the longitudinal straight edge 16 of the plate 11 is confined. This arrangement is such that the two plates 11 and 12 form a vane in the shape of an elongated, relatively normally-flat sleeve, which sleeve is open at its opposite ends and has its opposite longitudinal edges confined in the notches 9 of the struts 8 as clearly shown in FIG. 2.

Located within each vane and confined between the plates 11 and 12 thereof, is a pneumatic casing 10 which may be composed of rubber, neoprene, plastic or possibly coated or treated fabric, or of any other suitable material capable of providing an inflatable casing. Each of the casings 10 is distensible under air pressure, but while flexible it need not necessarily be expansible or stretchable. The casings are each closed at one end, as indicated at 17 and are each provided at the opposite end with a neck 18 coupled to a nipple containing a suitable air valve, the nipples projecting from an air manifold or supply pipe 20 connected to a suitable source of air supply.

Figure 3:
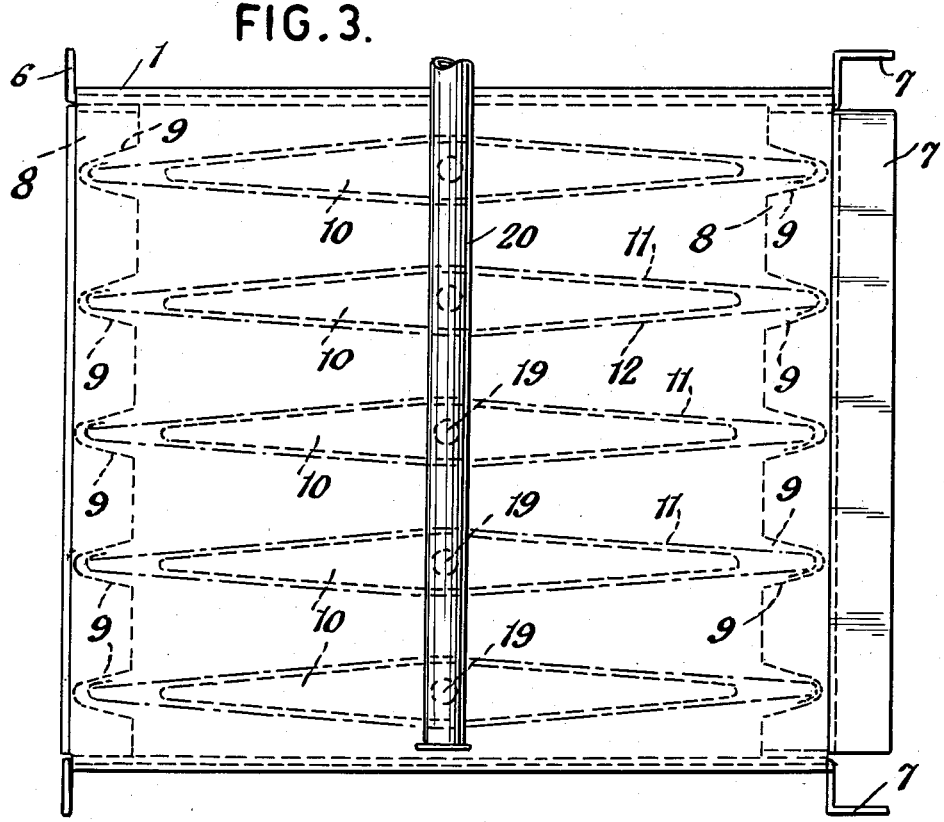
FIG. 3 is an end elevational view, on an enlarged scale, of the structure of FIG. 1.
Figure 4:
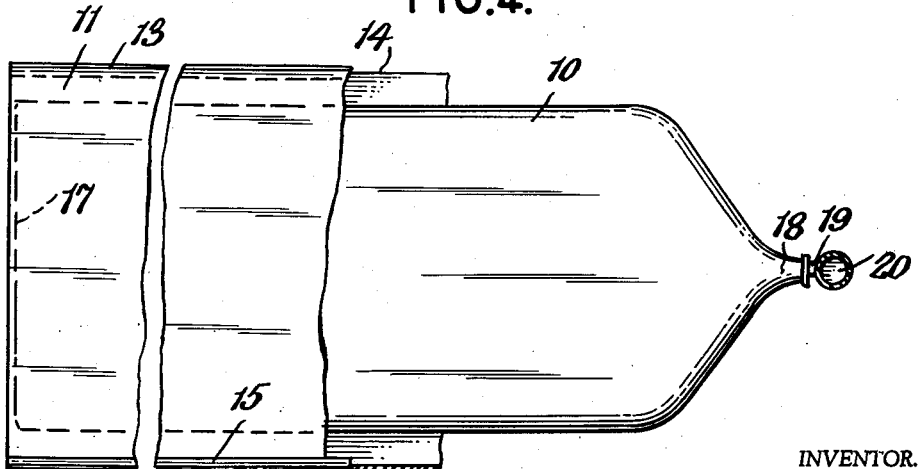
FIG. 4 is a top plan view of one of the pneumatic casings, showing parts of the vanes fitted about the same.

In FIGS. 1, 2 and 3, the damper is shown in its open position, at which time the casings 10 are deflated or flattened to such an extent as to permit the vanes to flatten to a required degree to permit of the passage of the air between them. When the parts are in this condition, the damper is in its open position. When air is passed through the manifold 20 it will enter into the several casings 10 to thereby cause the casings to become inflated and they will flex the plates 11 and 12 apart thus causing the bottom and top plates of the several vanes to come into contact, as shown in dot-and-dash lines in FIG. 2, to thereby close the spaces between the several vanes and thus close the damper. By control of the amount of air entering the casings 10, the extent to which the vane plates will be flexed can be controlled and hence the spacing between the several vanes will be regulated to thereby fully close, or fully or partly open the damper.

Figure 7:
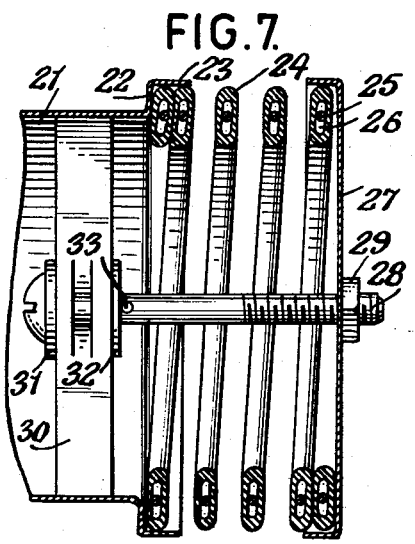
FIG. 7 is a longitudinal sectional view of a spiral type of pneumatic damper, shown in its open position.
Figure 8:
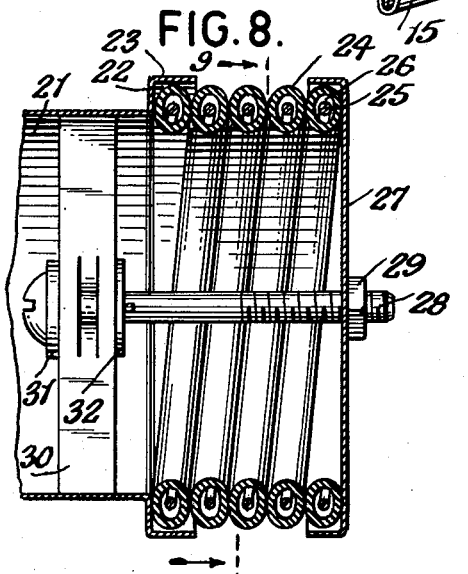
FIG. 8 is a similar view, but showing the damper in its closed position.
Figure 9:
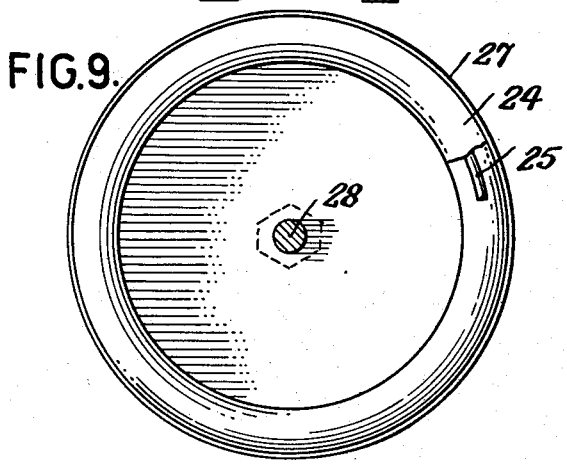
FIG. 9 is a sectional view, taken substantially on the line 9—9 of FIG. 8, looking in the direction of the arrows.

In the embodiment of the invention shown in FIGS. 7 to 9 inclusive, a collar 21 is adapted for suitable connection to an air duct, and it is provided at one end with an annular seat 22 formed with a peripheral flange 23. Resting against the seat 22 is a spiral pneumatic tube 24 of inflatable nature, and confined within the tube is a spiral spring 25 preferably, but not necessarily, of round spring wire, the diameter of the spring material being less than the size of the interior passage through the tube to thereby permit of the entry of air into the interior of the tube to inflate the same when desired. A suitable air inlet for the tube can be provided at any convenient point along its length, this being omitted from the drawing to simplify the disclosure. The spring 25 tends to hold the tube in its spiral formation.

At the end of the tube remote from the seat 22 is a disc-shaped cap 27 which is adjustable toward or away from the seat 22 by means of a bolt 28 and the nut 29 threadable thereon. The bolt is rotative in a brace member or strut 30 extending transversely within the collar 21, said strut being split in a manner to accommodate the bolt 28 and permit of its rotative movement, the bolt being held against axial shift relatively to the strut by means of the washers 31 and 32 and cross-pin 33. In this embodiment of the invention, one end of the tube 24 may be connected to a suitable source of air under pressure and when the air is delivered into the inner passage 26 in the tube, the tube which is normally flat as shown in FIG. 7 and has its convolutions spaced apart while flat, will assume the inflated oval or round condition of FIG. 8, thus bringing its convolutions into contact to close the spaces between them.

FIG. 7 illustrates the open position of the damper wherein it will be seen that the spacing between the convolutions of the pneumatic tube permit the air to flow out through this spacing. On inflation of the tube as shown in FIG. 8, the change in the shape of the tube brings its convolutions together or in contact, thus closing the spacing between the same and shutting off the damper.

In the embodiment of the invention disclosed in FIGS. 10 to 13 inclusive, a housing or casing generally indicated at 40 is provided with a top wall 41, a bottom wall 42, and end walls 43 and 44, said housing being in the form of a rectangular sleeve and being open at two sides. Mounted within the housing and supported by the end walls 43 and 44 thereof are supports for the inflatable or pneumatic casings indicated at 45 and 46. Each of these supports includes end plates 47 secured to the end walls 43 and 44, and a plate or vane 48 extends between and is secured to the end plates. The plane of each end plate is preferably at right angles to the plane of the vane which the end plates 47 support.

The inflatable or pneumatic casings 45 which enclose and which are supported by the supports consisting of the end plates and vanes secured thereto, have a flattened central area 49 which, when the casings are in their deflated condition, as seen in FIG. 10, lies closely adjacent to its vane 48 so that the spacing between these flattened parts of the casings is at maximum and permits of the greatest flow of air between the casings. An air supply pipe 50, provided with nipples 51 containing suitable valves, is employed to simultaneously inflate the casings 45, 46 to thus cause the casings to assume the cylindrical shape shown in FIG. 12 wherein the surfaces of the casings come into contact, thus closing the spacing between them and preventing the passage of air. While two of the inflatable casings are shown, it will be understood that this is illustrative since this number may be materially increased.

In the embodiment of the invention shown in FIGS. 14 and 15, a cylindrical sleeve or collar is shown at 52, the circumferential wall thereof being provided with two transverse or diametrically-extending braces or struts 53 which serve to confine an inflatable, spiral casing 54 between them and within the collar. The spiral casing 54 is maintained in its spiral formation by means of a spiral spring 55 contained within it, and which may be of flat spring stock formed into a spiral, or it can be of spring wire.

One end of the inflatable, spiral casing 54, as well as an end of its contained spring 55 is secured to the wall of the sleeve or collar 52 by means of a fastener 56 and the inflatable casing and its contained spring are held against displacement axially of the collar by being confined therein by the struts 53. The inflatable casing is provided at a suitable point with an air inlet leading from a suitable air supply.

In FIG. 14, the device is shown in its deflated condition, wherein it will be noted that the casing 54 has assumed a relatively flat formation so that spacing through which an air flow can pass, exists between the convolutions. When air is delivered into the casing, and the same becomes inflated, it will assume the condition shown in FIG. 15 wherein the convolutions will come into contact and the spacing between them closed to either shut off the flow through the device or if desired, reduce the amount that passes through it.

In the several embodiments of the invention, the closure or shut-off of the damper is effected by pneumatic means with a material decrease in the mechanism required to operate the same. In addition, the closure of the damper is effected speedily and quietly.

Having described several embodiments of the invention, it is obvious that the same is not to be restricted thereto, but is broad enough to cover all structures coming within the scope of the annexed claims.

What we claim is:

1. A damper comprising, a plurality of normally flat metallic sleeves supported across an air inlet in spaced relationship to thereby provide air passages between them, each of the sleeves consisting of a pair of opposed walls articulated at their edges to permit of flexing movement of the walls relatively to one another, means at the opposite ends of the sleeves for supporting the same in a manner to permit of distension of the walls of the sleeves, an inflatable member contained in each sleeve and positioned between the opposite walls of the same and adapted by its inflation to force the opposite walls of the sleeve apart to thereby move such walls toward similarly distended walls of adjacent sleeves to reduce the effective sizes of the passages between the sleeves.

2. In a damper as provided for in claim 1, whereon one end of one of the walls of each sleeve is formed with an inturned flange extended over an end of the opposite wall of the sleeve, with the latter wall having an inturned flange extended over the second end of the first wall, and the supporting means for the sleeves consisting of notched members in which the overlapped end portions of the sleeves are positioned.

3. A damper comprising, a housing, inflatable means in the form of a plurality of separate, spaced-apart, normally flat casings located in the housing, a distensible vane fitted over and enclosing each casing, each vane being composed of a pair of facially-opposed plates being articulated at their edges and capable of relative movement whereby inflation of the casings will spread the plates apart and to thereby reduce the spacing between said vanes.

4. A damper as provided for in claim 3 in which the said plates are resilient whereby they will be returned to their original position upon deflation of the casings.

References Cited in the file of this patent
UNITED STATES PATENTS

| | | |
|---|---|---|
| 1,931,356 | Porter | Oct. 17, 1933 |
| 1,991,184 | Towner | Feb. 12, 1935 |
| 2,592,724 | O'Neil | Apr. 15, 1952 |
| 2,660,946 | Peple | Dec. 7, 1953 |
| 2,672,088 | Orr | Mar. 16, 1954 |
| 2,676,609 | Pfarrer | Apr. 27, 1954 |
| 2,687,145 | Carter | Aug. 24, 1954 |
| 2,712,786 | Argentieri | July 12, 1955 |
| 2,874,925 | Stafford | Feb. 24, 1959 |